United States Patent [19]
Balz et al.

[11] Patent Number: 5,808,268
[45] Date of Patent: Sep. 15, 1998

[54] METHOD FOR MARKING SUBSTRATES

[75] Inventors: James G. Balz, Maybrook; Mark J. LaPlante, Walden; David C. Long; Brenda L. Peterson, both of Wappingers Falls, all of N.Y.

[73] Assignee: International Business Machines Corporation, Armonk, N.Y.

[21] Appl. No.: 686,239

[22] Filed: Jul. 23, 1996

[51] Int. Cl.$^6$ .................................................. B23K 26/00
[52] U.S. Cl. ............................................................ 219/121.8
[58] Field of Search .......................... 219/121.8, 121.76, 219/121.77, 121.81, 121.68, 121.69; 345/471

[56] References Cited

U.S. PATENT DOCUMENTS

| | | |
|---|---|---|
| 3,925,785 | 12/1975 | Firtion et al. . |
| 4,564,739 | 1/1986 | Mattelin . |
| 4,594,674 | 6/1986 | Boulia et al. ............................ 345/471 |
| 4,636,043 | 1/1987 | Bellar ................................. 219/121.68 |
| 4,652,722 | 3/1987 | Stone et al. . |
| 4,727,235 | 2/1988 | Stamer et al. ....................... 219/121.68 |
| 4,789,770 | 12/1988 | Kasner et al. . |
| 4,940,881 | 7/1990 | Sheets . |
| 5,109,149 | 4/1992 | Leung . |
| 5,206,496 | 4/1993 | Clement et al. . |
| 5,229,574 | 7/1993 | Stone ................................. 219/121.68 |
| 5,239,158 | 8/1993 | Locklear et al. . |
| 5,260,542 | 11/1993 | Ishiguro et al. .................... 219/121.68 |
| 5,294,774 | 3/1994 | Stone . |
| 5,309,273 | 5/1994 | Mori et al. .......................... 219/121.68 |
| 5,329,090 | 7/1994 | Woelki et al. ....................... 219/121.68 |

FOREIGN PATENT DOCUMENTS 0 472 049 A2 2/1992 European Pat. Off. .
WO 92/09399 6/1992 WIPO .

OTHER PUBLICATIONS

SPIE, Advances in Laser Engineering and Applications, "Neodymium yttrium aluminum garnet (Nd: YAG) laser marking system", by R.L. Hansen, vol. 247, pp. 18–23 (1980).

Semiconductor International, "Laser Marking of Plastic Components", by Koller et al., p. 106, Jun. (1991).

Primary Examiner—Geoffrey S. Evans
Attorney, Agent, or Firm—DeLio & Peterson, LLC; Peter W. Peterson; Aziz M. Ahsan

[57] ABSTRACT

A method for marking a surface with high-density indicia comprising the steps of providing a marking device, providing input data defining indicia to be marked on the surface wherein the indicia comprises characters and the input data further defines a font for each character of the indicia, determining pixels for each character in accordance with the font, forming raster lines in accordance with the pixels, and traversing each raster line with the marking device to mark the surface according to the pixels of the raster line. If a laser is used as the marking device, the laser may need time to recharge in between marking closely spaced pixels. Thus, the laser may pass over certain pixels while the laser is recharging. Therefore, the laser may have to make an additional pass over the raster line to mark the pixels that were skipped over while the laser was recharging.

15 Claims, 2 Drawing Sheets

METHOD FOR MARKING SUBSTRATES

BACKGROUND OF THE INVENTION

1. Field of the Invention

The present invention relates to a method for marking substrates used in the fabrication of electronic components.

2. Problem to be Solved

Ceramic substrates are typically used to fabricate integrated circuit components such as direct access storage devices (DASD). In order to implement quality control procedures with respect to such devices, it is necessary to mark each the substrate of each device with indicia, e.g. a serial number, to facilitate identification and tracking of the device. Such indicia could comprise 10 or more characters. Since thousands of devices are typically fabricated on a single substrate, the density of indicia is relatively high. Furthermore, the indicia is unique for each device. Thus, a data-driven marking technique is required.

Lasers are typically used to mark the substrates, a process whereby a laser beam is directed to the surface of the substrate to form the characters of the identifying indicia corresponding to that particular device. The indicia is arranged in an array having rows and columns. Each character has a corresponding row and column. Conventional methods of marking the substrates entail scribing or engraving one complete individual character at a time in a consecutive or sequential manner. Thus, the laser is moved across a row or down a column to completely and consecutively scribe or form each character in that row or column. When the last character in the row or column is formed, the laser begins forming characters in the next row or column. This method is known as vector scanning. However, vector scanning consumes a significant amount of time and seriously degrades production efficiency.

It is therefore an object of the present invention to provide a method of marking substrates that consumes significantly less time than conventional methods.

It is another object of the present invention to provide a method of marking substrates that can be implemented with commercially available equipment.

A further object of the invention is to provide a method of marking substrates that can be implemented at reasonable costs.

Another object of the present invention is to provide a method of marking substrates that uses a data-driven marking device.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method for marking a surface with high-density indicia comprising the steps of:

a) providing a marking device;

b) providing input data defining indicia to be marked on the surface, the indicia comprising characters, the input data further defining a font for each character of the indicia;

c) determining pixels or line segments for each character in accordance with the font;

d) forming raster lines in accordance with the pixels or line segments; and e) traversing each raster line with the marking device to mark the surface according to the pixels or line segments of the raster line.

In a related aspect, the present invention is directed to a method for marking a substrate with high-density indicia comprising the steps of:

a) providing a marking device;

b) providing input data defining indicia to be marked on the substrate, the indicia comprising characters, the input data further defining a font for each character of the indicia;

c) determining pixels or line segments for each character in accordance with the font;

d) forming raster lines in accordance with the pixels or line segments; and e) traversing one raster line at a time with the marking device to mark the substrate according to the pixels or line segments of the raster line being traversed.

In another aspect, the present invention is directed to a method for marking a substrate with high-density indicia comprising the steps of:

a) providing a laser marking device;

b) providing input data defining indicia to be marked on the substrate, the indicia comprising characters, the input data further defining a font for each character of the indicia;

c) determining pixels or line segments for each character in accordance with the font;

d) forming raster lines in accordance with the pixels or line segments; and e) traversing one raster line at a time with the laser marking device to allow the laser to mark the substrate according to the pixels or line segments of the raster line being traversed;

wherein the substrate is traversed in a first direction and a second direction that is opposite the first direction, the direction of traversement changing from the first direction to the second direction or from the second direction to the first direction upon completion of marking the substrate in accordance with all the pixels or line segments of one of the raster lines.

In a further aspect, the present invention is directed to a method for marking a substrate with high-density indicia comprising the steps of:

a) providing a laser marking device, the device comprising a plurality of lasers;

b) providing input data defining indicia to be marked on the substrate, the indicia comprising characters, the input data further defining a font for each character of the indicia;

c) determining pixels or line segments for each character in accordance with the font;

d) forming raster lines in accordance with the pixels or line segments; and e) simultaneously traversing each raster line with a corresponding laser to mark the substrate according to the pixels or line segments of the raster line.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiment of the present invention, reference will be made herein to FIGS. 1 and 2 of the drawings in which like numerals refer to like features of the invention.

Figure 1:
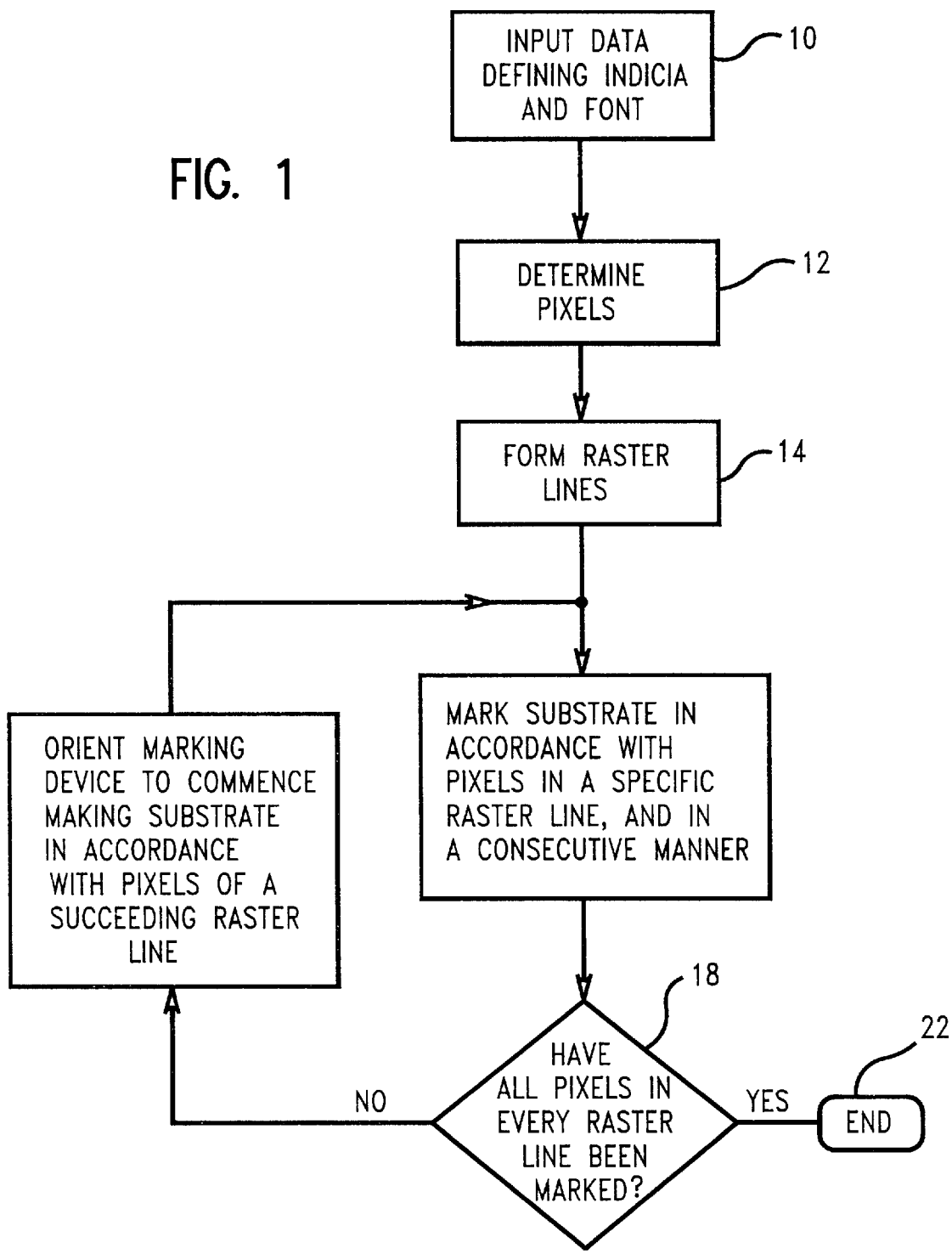
FIG. 1 is a flow diagram of the method of the present invention.
Figure 2:
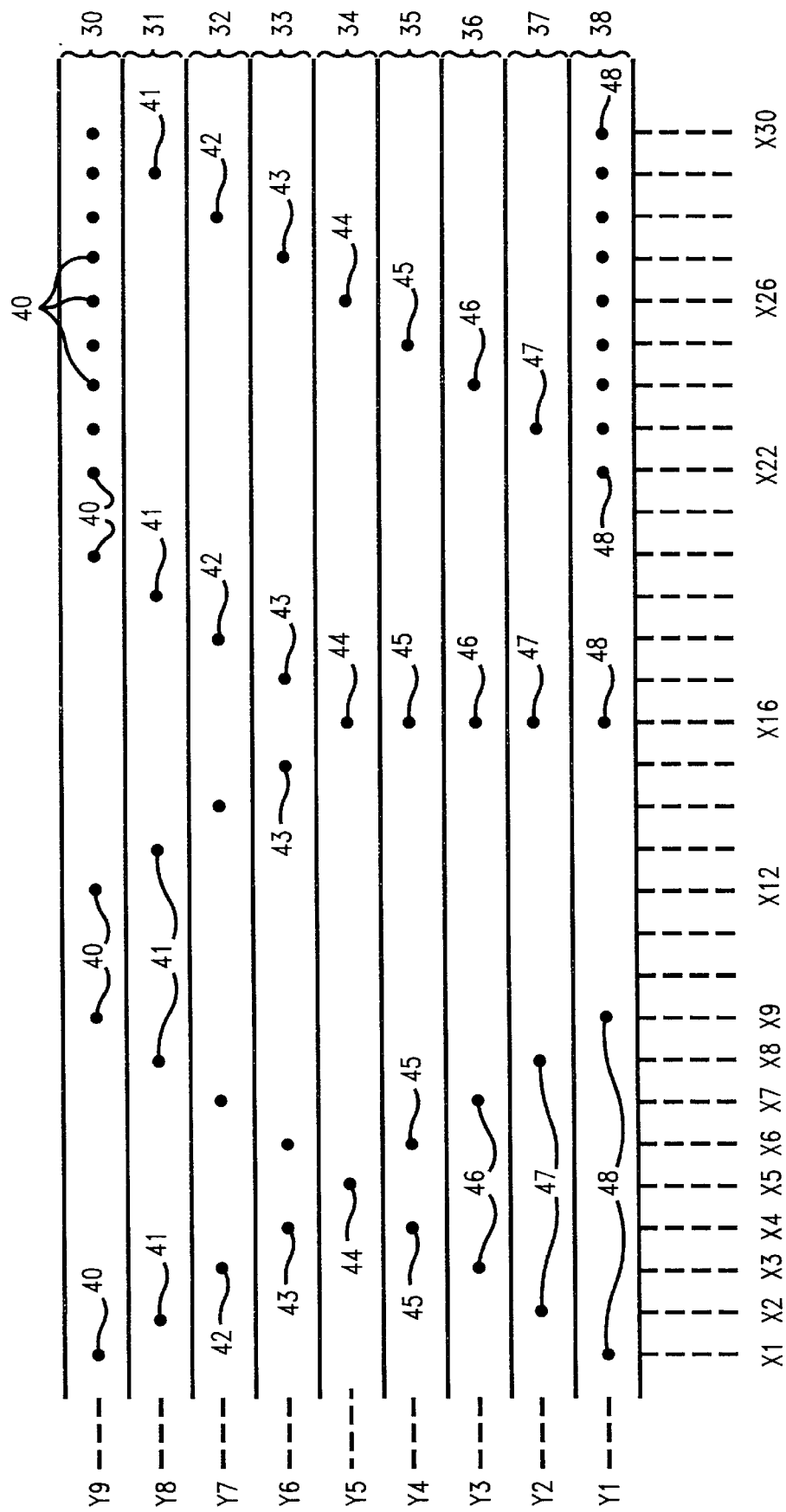
FIG. 2 illustrates the formation of pixels and raster lines in accordance with the method of the present invention.

Referring to FIG. 1, the method of the present invention starts at step 10. Step 10 effects the input of data which defines the indicia to be marked on the surfaces, substrates or wafers. The indicia can be numbers, letters or a combination of both. Other symbols may also be used. The input data also defines a font which determines the shape of each character of the indicia. Specifically, the font is a bit-mapped font wherein each character of the indicia is represented by an arrangement of dots and wherein each dot has a specific X-Y coordinate. The input data is then loaded into a storage medium such as a RAM (random access memory) or disk.

Step 12 effects determination or computation of the pixels that define each character of the indicia. The pixels are determined from the font. Specifically, a pixel is assigned to each X-Y coordinate defined by the font data. The pixels may then stored into a storage medium.

Step 14 then effects formation of raster lines based on the pixels determined in step 12. Referring to FIG. 2, the indicia having the letters "XYZ" is used as an example to facilitate description of the method of the present invention. Raster lines 30–38 contains pixels 40–48, respectively. Each raster line 30–38 contains pixels of each character of the identifying indicia. For example, raster line 30 contains pixels that are part of each character "X", "Y" and "Z". Each pixel has a location defined by X-Y coordinates which are determined in steps 10 and 12. For example, the first pixel 40 of the character "X", which is in raster line 30, has an X-Y coordinate location of $X_1Y_9$. In another example, the lowest and right-most pixel of the character "Z" has an X-Y coordinate of $X_{30}Y_1$.

Step 16 effects marking or engraving the substrate or wafer according to the all the pixels in one raster line at a time. Specifically, this step effects controlling a data-driven marking device, e.g. laser, to consecutively mark the substrates or wafers according to each pixel in a raster line, and then orient to begin marking the substrate according to the next raster line. Once the marking device is oriented in the position necessary to mark the substrate, the substrate is consecutively marked according to all the pixels in that particular raster line. The marking device is then oriented in a position necessary to mark the substrate according to the pixels in the succeeding raster line. Thus, the marking device completes marking the substrate according to one raster line before marking the substrate according to a succeeding raster line.

For example, if the marking device is initially positioned to mark the substrate at the pixel located at the X-Y coordinate $X_1Y_9$, then the marking device is moved to the right to consecutively mark the substrate at the locations indicated by the pixels. Thus, the substrate is marked at locations indicated by the X-Y coordinates of pixels 40 in raster line 30 and in the following order:

$X_1Y_9$
$X_9Y_9$
$X_{12}Y_9$
$X_{20}Y_9$
$X_{22}Y_9$
$X_{23}Y_9$
$X_{24}Y_9$
$X_{25}Y_9$
$X_{26}Y_9$
$X_{27}Y_9$
$X_{28}Y_9$
$X_{29}Y_9$
$X_{30}Y_9$

Once the substrate is marked according to all pixels 40 in raster line 30, the data-driven marking device is then oriented to commence marking the substrate at locations indicated by pixels 41 of raster line 31. The data-driven marking device may be oriented to start marking the substrate at the location indicated by the pixel having an X-Y coordinate of $X_2Y_8$. However, in a preferred embodiment, the data-driven marking device is oriented to start marking the substrate at the location indicated by pixel having an X-Y coordinate of $X_{29}Y_8$ so as to reduce the travel distance of the marking device. Thus, the substrate is marked at the locations indicated by pixels 41 in raster line 31 consecutively and according to the following order:

$X_{29}Y_8$
$X_{19}Y_8$
$X_{13}Y_8$
$X_8Y_8$
$X_2Y_8$

The remaining portions of the substrate are marked in the same fashion wherein the marking device marks the substrate at all locations indicated by pixels of one particular raster line and then begins marking the substrate at locations indicated by pixels in a succeeding raster line. Marking the substrate according to pixels located in a succeeding raster line does not begin until the substrate is completely marked according to the pixels in a previous raster line unless more than one marking device is used.

Step 18 determines whether the complete indicia has been marked on the substrate. Specifically, this step determines if the substrate has been marked in accordance with all pixels in every raster line. If the substrate has not been marked in accordance with all pixels in every raster line, then the method shifts to step 20 wherein the data-driven marking device is oriented to commence marking the substrate in accordance with the pixels in a succeeding raster line. If the substrate has been marked in accordance with all pixels in every raster line, then the method shifts to step 22 which ends the procedure.

Thus, the method of the present invention provides significant advantages over conventional marking methods with respect to the time necessary to complete marking a substrate. The ensuing example further demonstrates these advantages.

EXAMPLE

A DASD head was fabricated on a 125 mm ceramic wafer with about 7000 ups/wafer. Each head is individually serialized with a ten (10) digit number. Thus, approximately 70,000 characters, each about 100 microns high, must be scribed on each 125 mm wafer. The conventional vector scanning method required about four (4) hours to mark each 125 mm wafer with predetermined indicia. However, the method of the present required only about thirty (30) minutes because portions of many of the characters of the indicia were scribed within the time required for one (1) sweep of the laser beam across the substrate (1/36 second). Thus, the method of the present invention exhibited an 87.75% reduction in the time required to mark each 125 mm wafer.

In view of the foregoing description, it is apparent that the method of the present invention exhibits superior results when marking substrates with high-density indicia in comparison to conventional vector scanning methods. For example, a scan line, in the example, may include elements of 260 characters. The method of the present invention effects marking the substrate with those elements in the time required to mark a single scan line. On the other hand, the time required to mark a single "vector-line-element" is significantly greater than 1/260th the time to mark a single raster scan line.

The method of the present invention can be used with any type of data-driven marking devices such a laser scanning tools, continuous wave (CW) lasers, pulsed or pumped laser systems, ink jets, minature air brushes or mechanical scribers.

If a pulsed or pumped laser is used, the laser may need time to recharge in between marking closely spaced pixels. Thus, the laser may pass over certain pixels while the laser is recharging. Therefore, the laser may have to make an additional pass over the raster line to mark the pixels that were skipped over while the laser was recharging.

If a CW laser is to be used, a device to modulate the intensity of the laser beam as a raster line is traversed will be required. CW lasers are suitable when it is desired to form parts of the characters with line segments or continuous lines rather than a series of spots.

Since raster lines are on a fixed interval, more than one laser beam could be used. For example, each laser beam could work on a corresponding raster line. Thus, the time required to mark an entire substrate would scale, approximately, inversely to the number of laser beams. If a multiple laser beam scheme is used, the firing of each laser would need to be independently programmable.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for marking a surface with high-density indicia comprising the steps of:
    a) providing a marking device;
    b) providing input data defining indicia to be marked on the surface, the indicia comprising characters, the input data further defining a font for each character of the indicia;
    c) determining pixels for each character in accordance with the font;
    d) forming raster lines in accordance with the pixels;
    e) traversing each raster line with the marking device to mark the surface according to at least some of said pixels of the raster line; and
    f) retraversing each raster line with said marking device, to mark any pixels that were skipped in step (e).

2. The method as set forth in claim 1 wherein in the traversing step (e), one raster line at a time is traversed so as to mark the surface according to each pixel of the raster line being traversed.

3. The method as set forth in claim 2 wherein in the traversing step (e), all the raster lines are simultaneously traversed with the marking device so as to mark the surface according to each pixel of every raster line.

4. The method as set forth in claim 1 wherein the marking device comprises a CW laser.

5. The method as set forth in claim 1 wherein the marking device comprises a pulsed laser.

6. The method as set forth in claim 3 wherein the marking device comprises a plurality of lasers, each raster line being traversed with a corresponding laser, all raster lines being traversed simultaneously.

7. The method for marking of claim 1, wherein said step (b), providing input data defining a font, further includes having characters with predetermined pixel and scan line spacing such that in said step (f), retraversing with said marking device, said pixel spacing and scan line spacing are variable in accordance with said font.

8. A method for marking a surface with high-density indicia using a pulsed laser, comprising the steps of:
    a) providing a pulsed laser for marking said surface;
    b) providing input data defining indicia to be marked on the surface, the indicia comprising characters, the input data further defining a font for each character of the indicia;
    c) determining pixels for each character in accordance with the font;
    d) forming raster lines in accordance with the pixels;
    e) traversing each raster line with said pulsed laser to mark the surface according to the pixels of the raster line wherein said laser passes over at least some of said pixels while said laser is recharging; and
    f) retraversing each of said raster lines with said pulsed laser to mark any pixels that were skipped during traversing step (e).

9. The method for marking of claim 8, wherein said step (b), providing input data defining a font, further includes having characters with predetermined pixel and scan line spacing such that in said step (f), retraversing with said pulsed laser, said pixel spacing and scan line spacing are variable in accordance with said font.

10. A method for marking a substrate with high-density indicia comprising the steps of:
    a) providing a marking device;
    b) providing input data defining indicia to be marked on the substrate, the indicia comprising characters, the input data further defining a font for each character of the indicia;
    c) determining pixels for each character in accordance with the font;
    d) forming raster lines in accordance with the pixels;
    e) traversing one raster line at a time with the marking device to mark the substrate according to at least some of said pixels of the raster line being traversed; and
    f) retraversing each raster line with said marking device, to mark any pixels that were skipped in step (e).

11. The method as set forth in claim 10 further comprising step (f) of repeating steps (e) until the substrate is marked at all locations indicated by the pixels of all the raster lines.

12. The method as set forth in claim 10 wherein traversing the substrate comprises traversing the substrate in a first direction and a second direction that is opposite the first direction, the direction of traversement changing from the first direction to the second direction or from the second direction to the first direction upon completion of marking the substrate in accordance with all the pixels of a raster line.

13. A method for marking a substrate with high-density indicia comprising the steps of:

a) providing a laser marking device;

b) providing input data defining indicia to be marked on the substrate, the indicia comprising characters, the input data further defining a font for each character of the indicia;

c) determining pixels for each character in accordance with the font;

d) forming raster lines in accordance with the pixels;

e) traversing one raster line at a time with the laser marking device to allow the laser to mark the substrate according to at least some of said pixels of the raster line being traversed; and f) retraversing each raster line with said marking device, to mark any pixels that were skipped in step (e);

wherein the substrate is traversed in a first direction and a second direction that is opposite the first direction, the direction of traversement changing from the first direction to the second direction or from the second direction to the first direction upon completion of marking the substrate in accordance with some of said pixels of one of the raster lines.

14. A method for marking a substrate with high-density indicia comprising the steps of:

a) providing a laser marking device, the device comprising a plurality of lasers;

b) providing input data defining indicia to be marked on the substrate, the indicia comprising characters, the input data further defining a font for each character of the indicia such that said characters have predetermined pixel and scan line spacing;

c) determining pixels for each character in accordance with the font;

d) forming raster lines in accordance with the pixels;

e) simultaneously traversing each raster line with a corresponding laser to mark substrate according to at least some of said pixels of the raster line; and f) retraversing each raster line with said laser marking device, to mark any pixels that were skipped in step (e), such that said pixel spacing and said scan line spacing is variable in accordance with said font.

15. A method for marking a surface with high-density indicia comprising the steps of:

a) providing a marking device;

b) providing input data defining indicia to be marked on the surface, the indicia comprising characters, the input data further defining a font for each character of the indicia such that said characters have predetermined pixel and scan line spacing;

c) determining line segments and pixels for each character in accordance with the font;

d) forming raster lines in accordance with the line segments and pixels;

e) traversing each raster line with the marking device to mark the surface according to some of said line segments and pixels of the raster line; and f) retraversing each raster line with said marking device, to mark any line segments and pixels that were skipped in step (e), such that said pixel spacing and said scan line spacing is variable in accordance with said font.

* * * * *